US008099187B2

(12) United States Patent  
Nehowig et al.

(10) Patent No.: US 8,099,187 B2  
(45) Date of Patent: *Jan. 17, 2012

(54) SECURELY PROCESSING AND TRACKING CONSUMABLE SUPPLIES AND CONSUMABLE MATERIAL

(75) Inventors: Kelly R. Nehowig, Maple Grove, MN (US); David T. Gale, Champlin, MN (US); Lisa A. Fischer, Plymouth, MN (US); Keith A. Platfoot, Eden Prairie, MN (US); John E. Ekers, Plymouth, MN (US); Thomas A. Zappe, Fridley, MN (US)

(73) Assignee: HID Global Corporation, Irvine, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/465,494

(22) Filed: Aug. 18, 2006

(65) Prior Publication Data

US 2007/0056027 A1 Mar. 8, 2007

Related U.S. Application Data

(63) Continuation-in-part of application No. 11/261,450, filed on Oct. 28, 2005, now Pat. No. 7,620,815.

(60) Provisional application No. 60/715,945, filed on Sep. 9, 2005, provisional application No. 60/709,401, filed on Aug. 18, 2005.

(51) Int. Cl.  
*G06F 17/00* (2006.01)

(52) U.S. Cl. ............... 700/244; 347/14; 726/5

(58) Field of Classification Search ............ 700/231, 700/244; 347/6, 7, 14, 19, 86; 726/5, 18–20  
See application file for complete search history.

(56) References Cited

U.S. PATENT DOCUMENTS 3,193,430 A 7/1965 Messmer et al. .......... 156/355

(Continued)

FOREIGN PATENT DOCUMENTS

DE 25 35 699 A1 3/1977

(Continued)

OTHER PUBLICATIONS

U.S. Appl. No. 60/715,945, filed Sep. 9, 2005 entitled "Print Security Management".  
U.S. Appl. No. 60/709,401, filed Aug. 18, 2005 entitled "Print Hub".  
U.S. Appl. No. 11/465,510, filed Aug. 18, 2006 entitled "Central Management of a Credential Production System".  
U.S. Appl. No. 60/373,967, filed Apr. 19, 2002 entitled "Identification Card Manufacturing Device Having Secure Media".  
Office Action dated Oct. 18, 2005 for U.S. Appl. No. 10/372,011, filed Feb. 21, 2003.  
Office Action dated Apr. 18, 2006 for U.S. Appl. No. 10/372,011, filed Feb. 21, 2003.  
Final Office Action dated Dec. 6, 2006 for U.S. Appl. No. 10/372,011, filed Feb. 21, 2003.

(Continued)

*Primary Examiner* — Charles Kasenge  
(74) *Attorney, Agent, or Firm* — Westman, Champlin & Kelly, P.A.

(57) ABSTRACT

A credential production system and methods for securely processing a credential substrate and tracking quantities of consumable material using a credentials production system and secured consumable supplies. The system includes a consumable supply and a memory that contains a state identifier that defines a state of the supply. A supply manager is configured to access the memory and set the state identifier to one of a production disabled state and a production enabled state. The system also includes a credential production device that is configured to receive the state of the supply. The credential production device is authorized to process a credential substrate using the consumable supply when the state identifier is set to the production enabled state, and the credential production device is prevented form processing the credential substrate using the supply when the state identifier is set to the production disabled state.

20 Claims, 4 Drawing Sheets

U.S. PATENT DOCUMENTS

| | | | |
|---|---|---|---|
| 3,446,415 A | 5/1969 | Bromley | 229/30 |
| 3,761,079 A | 9/1973 | Azure, Jr. | 271/41 |
| 3,887,106 A | 6/1975 | Charlson et al. | 221/197 |
| 3,889,472 A | 6/1975 | Guillaud | 60/698 |
| 3,960,072 A | 6/1976 | Ahlgren et al. | 101/35 |
| 4,021,032 A | 5/1977 | Gross et al. | 271/166 |
| 4,068,028 A | 1/1978 | Samonides | 428/40 |
| 4,146,900 A | 3/1979 | Arnold | 346/75 |
| 4,179,732 A | 12/1979 | Khan et al. | 364/200 |
| 4,282,583 A | 8/1981 | Khan et al. | 364/900 |
| 4,313,683 A | 2/1982 | Brown et al. | 400/225 |
| 4,393,386 A | 7/1983 | Di Giulio | 346/75 |
| 4,471,885 A | 9/1984 | Mucciarone | 221/155 |
| 4,534,313 A | 8/1985 | Louvel | 118/696 |
| 4,600,828 A | 7/1986 | Nogami et al. | |
| 4,604,631 A | 8/1986 | Jinnai et al. | 346/1.1 |
| 4,617,080 A | 10/1986 | Kobayashi et al. | 156/359 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,719,626 A | 1/1988 | Ogasawara | 371/16 |
| 4,734,868 A | 3/1988 | DeLacy | 364/519 |
| 4,750,743 A | 6/1988 | Nicoletti | 273/148 |
| 4,781,985 A | 11/1988 | Desjarlais | 428/421 |
| 4,827,425 A | 5/1989 | Linden | 364/478 |
| 4,864,618 A | 9/1989 | Wright et al. | 380/51 |
| 4,938,830 A | 7/1990 | Cannistra | 156/270 |
| 4,961,088 A | 10/1990 | Gilliland et al. | 355/206 |
| 5,018,614 A | 5/1991 | Ruckert | 194/236 |
| 5,025,399 A | 6/1991 | Wendt et al. | 364/519 |
| 5,027,135 A | 6/1991 | Negishi et al. | 346/154 |
| 5,161,233 A | 11/1992 | Matsuo et al. | 355/218 |
| 5,184,181 A | 2/1993 | Kurando et al. | 355/260 |
| 5,238,524 A | 8/1993 | Seki et al. | 156/538 |
| 5,266,968 A | 11/1993 | Stephenson | 346/76 |
| 5,267,800 A | 12/1993 | Petteruti et al. | 400/88 |
| 5,277,501 A | 1/1994 | Tanaka et al. | 400/120 |
| 5,290,067 A | 3/1994 | Langen | 283/60.1 |
| 5,318,369 A | 6/1994 | Ishii | 400/249 |
| 5,318,370 A | 6/1994 | Nehowig | 400/613 |
| 5,326,179 A | 7/1994 | Fukai et al. | 400/120 |
| 5,327,201 A | 7/1994 | Coleman et al. | 355/278 |
| 5,368,677 A | 11/1994 | Ueda et al. | 156/362 |
| 5,373,146 A | 12/1994 | Lei | 235/382.5 |
| 5,378,884 A | 1/1995 | Lundstrom et al. | 235/441 |
| 5,410,642 A | 4/1995 | Hakamatsuka et al. | 395/113 |
| 5,412,779 A | 5/1995 | Motoyama | 395/275 |
| 5,413,532 A | 5/1995 | Raby | 462/2 |
| 5,437,960 A | 8/1995 | Negate et al. | 430/256 |
| 5,441,921 A | 8/1995 | Verdonck et al. | 503/227 |
| 5,455,611 A | 10/1995 | Simon et al. | 347/49 |
| 5,466,319 A | 11/1995 | Zager et al. | 156/220 |
| 5,484,502 A | 1/1996 | Bozanic | 156/235 |
| 5,516,218 A | 5/1996 | Amano et al. | 400/535 |
| 5,534,857 A | 7/1996 | Laing et al. | 340/825.34 |
| 5,537,554 A | 7/1996 | Motoyama | 395/280 |
| 5,544,289 A | 8/1996 | Motoyama | 395/280 |
| 5,550,735 A | 8/1996 | Slade et al. | 364/401 |
| 5,550,984 A | 8/1996 | Gelb | 395/200.17 |
| 5,552,994 A | 9/1996 | Cannon et al. | 364/468.01 |
| 5,558,449 A | 9/1996 | Morgavi | 400/188 |
| 5,568,618 A | 10/1996 | Motoyama | 395/280 |
| 5,573,621 A | 11/1996 | Boreali | 156/256 |
| 5,617,528 A | 4/1997 | Stechmann et al. | 395/161 |
| 5,630,581 A | 5/1997 | Rodesch | 271/23 |
| 5,633,932 A | 5/1997 | Davis et al. | |
| 5,637,174 A | 6/1997 | Field et al. | 156/256 |
| 5,646,388 A | 7/1997 | D'Entremont et al. | 235/380 |
| 5,649,120 A | 7/1997 | Motoyama | 395/280 |
| 5,673,076 A | 9/1997 | Nardone et al. | 347/171 |
| 5,688,738 A | 11/1997 | Lu | |
| 5,695,589 A | 12/1997 | German et al. | 156/250 |
| 5,709,484 A | 1/1998 | Dorner | 400/188 |
| 5,709,485 A | 1/1998 | Kohno | 400/208 |
| 5,715,381 A | 2/1998 | Hamilton | 395/114 |
| 5,717,776 A | 2/1998 | Watanabe | 382/116 |
| 5,727,137 A | 3/1998 | LeClair et al. | 375/116 |
| 5,745,036 A | 4/1998 | Clare | 340/572 |
| 5,758,184 A | 5/1998 | Lucovsky et al. | 395/826 |
| 5,768,143 A | 6/1998 | Fujimoto | 364/479 |
| 5,768,483 A | 6/1998 | Maniwa et al. | 395/114 |
| 5,768,495 A | 6/1998 | Campbell et al. | 395/183.01 |
| 5,771,058 A | 6/1998 | Kobayashi | 347/218 |
| 5,771,071 A | 6/1998 | Bradley et al. | 348/335 |
| 5,771,382 A | 6/1998 | Wang et al. | 395/670 |
| 5,774,678 A | 6/1998 | Motoyama | 395/280 |
| 5,783,024 A | 7/1998 | Forkert | 156/351 |
| 5,785,224 A | 7/1998 | Nawakowski | 225/4 |
| 5,790,162 A | 8/1998 | Adams et al. | 347/222 |
| 5,796,420 A | 8/1998 | Kaerts et al. | 347/188 |
| 5,805,810 A | 9/1998 | Maxwell | 395/200.36 |
| 5,807,461 A | 9/1998 | Hagstrom | 156/361 |
| 5,819,110 A | 10/1998 | Motoyama | 395/835 |
| 5,822,534 A | 10/1998 | Yamunachari et al. | 395/200.54 |
| 5,828,567 A | 10/1998 | Eryurek et al. | 364/184 |
| 5,835,911 A | 11/1998 | Nakagawa et al. | 707/203 |
| 5,837,991 A | 11/1998 | LaManna et al. | 235/475 |
| 5,850,901 A | 12/1998 | Schuster et al. | 198/370.05 |
| 5,860,068 A | 1/1999 | Cook | 705/26 |
| 5,862,260 A | 1/1999 | Rhoads | 382/232 |
| 5,873,606 A | 2/1999 | Haas et al. | 283/75 |
| 5,874,145 A | 2/1999 | Waller | 428/42.1 |
| 5,884,014 A | 3/1999 | Huttenlocher et al. | 395/114 |
| 5,886,334 A | 3/1999 | D'Entremont et al. | 235/380 |
| 5,887,216 A | 3/1999 | Motoyama | 399/8 |
| 5,889,866 A | 3/1999 | Cyras et al. | 380/49 |
| 5,889,941 A | 3/1999 | Tushie et al. | 395/186 |
| 5,936,542 A | 8/1999 | Kleinrock et al. | 340/825.34 |
| 5,941,414 A | 8/1999 | Kasper | 221/210 |
| 5,941,522 A | 8/1999 | Hagstrom et al. | 271/225 |
| 5,962,832 A | 10/1999 | Dorner | 235/380 |
| 5,973,692 A | 10/1999 | Knowlton et al. | 345/348 |
| 5,980,011 A | 11/1999 | Cummins et al. | 347/4 |
| 6,014,748 A | 1/2000 | Tushie et al. | 713/200 |
| 6,022,429 A | 2/2000 | Hagstrom | 156/64 |
| 6,033,832 A | 3/2000 | Wingender | 430/373 |
| 6,070,146 A | 5/2000 | Mimata | 705/13 |
| 6,100,804 A | 8/2000 | Brady et al. | 340/572.7 |
| 6,110,864 A | 8/2000 | Lu | |
| 6,182,136 B1 | 1/2001 | Ramanathan et al. | 709/224 |
| 6,189,103 B1 | 2/2001 | Nevarez et al. | 713/201 |
| 6,196,459 B1 | 3/2001 | Goman et al. | 235/380 |
| 6,199,753 B1 | 3/2001 | Tracy et al. | 235/375 |
| 6,219,669 B1 | 4/2001 | Haff et al. | 707/10 |
| 6,220,511 B1 | 4/2001 | Holec et al. | 235/380 |
| 6,233,683 B1 | 5/2001 | Chan et al. | 713/172 |
| 6,272,472 B1 | 8/2001 | Danneels et al. | 705/27 |
| 6,292,092 B1 | 9/2001 | Chow et al. | 340/5.6 |
| 6,298,336 B1 | 10/2001 | Davis et al. | 705/41 |
| 6,335,799 B1 | 1/2002 | Provost | 358/1.4 |
| 6,362,893 B1 | 3/2002 | Francis et al. | |
| 6,367,011 B1 | 4/2002 | Lee et al. | 713/150 |
| 6,380,965 B1 | 4/2002 | Sims et al. | 347/218 |
| 6,385,407 B1* | 5/2002 | Inose | 399/24 |
| 6,386,772 B1 | 5/2002 | Klinefelter et al. | 400/208 |
| 6,412,991 B1 | 7/2002 | Klinefelter et al. | 400/240 |
| 6,497,469 B1* | 12/2002 | Shinada et al. | 347/19 |
| 6,554,512 B2 | 4/2003 | Heno et al. | 400/625 |
| 6,582,141 B2 | 6/2003 | Meier et al. | 400/701 |
| 6,584,564 B2 | 6/2003 | Olkin et al. | 713/152 |
| 6,629,134 B2 | 9/2003 | Hayward et al. | 709/217 |
| 6,631,967 B1 | 10/2003 | Saruta | 347/19 |
| 6,632,250 B1 | 10/2003 | Lynch et al. | 707/517 |
| 6,633,405 B1 | 10/2003 | Nguyen | 358/1.16 |
| 6,644,771 B1 | 11/2003 | Silverbrook | 347/19 |
| 6,647,871 B2 | 11/2003 | Morand | 101/33 |
| 6,650,430 B2 | 11/2003 | Francis et al. | 385/1.14 |
| 6,662,999 B1 | 12/2003 | Vancour et al. | 235/375 |
| 6,663,100 B2 | 12/2003 | Crowley | 271/165 |
| 6,666,540 B2* | 12/2003 | Asauchi | 347/19 |
| 6,668,322 B1 | 12/2003 | Wood et al. | 713/182 |
| 6,694,884 B2 | 2/2004 | Klinefelter et al. | 101/484 |
| 6,695,205 B1 | 2/2004 | Lundstrom et al. | 235/380 |
| 6,702,282 B2 | 3/2004 | Pribula et al. | 271/272 |
| 6,711,678 B2 | 3/2004 | Ferguson | 713/513 |
| 6,732,101 B1 | 5/2004 | Cook | 7/10 |

| | | | |
|---|---|---|---|
| 6,732,148 B1 | 5/2004 | Estrada et al. | 709/205 |
| 6,738,903 B1 * | 5/2004 | Haines | 713/168 |
| 6,758,616 B2 | 7/2004 | Pribula et al. | 400/624 |
| 6,783,067 B2 | 8/2004 | Kreuter et al. | 235/381 |
| 6,788,800 B1 | 9/2004 | Carr et al. | 382/100 |
| 6,792,544 B2 | 9/2004 | Hashem et al. | 713/201 |
| 6,802,586 B2 | 10/2004 | Forman | 347/19 |
| 6,816,968 B1 | 11/2004 | Walmsley | 713/168 |
| 6,826,609 B1 | 11/2004 | Smith et al. | 709/225 |
| 6,850,900 B1 | 2/2005 | Hare et al. | 705/26 |
| 6,850,911 B1 | 2/2005 | Huether | 705/51 |
| 6,856,975 B1 | 2/2005 | Inglis | 705/51 |
| 6,902,107 B2 | 6/2005 | Shay et al. | 235/381 |
| 6,929,413 B2 | 8/2005 | Schofield | 400/103 |
| 6,932,527 B2 | 8/2005 | Pribula et al. | 400/621 |
| 6,975,816 B2 * | 12/2005 | Ito et al. | 347/19 |
| 6,985,167 B2 | 1/2006 | Lien | 347/171 |
| 6,997,629 B2 | 2/2006 | Bungert et al. | 400/613 |
| 7,013,410 B2 | 3/2006 | Asauchi | 714/46 |
| 7,070,100 B2 | 7/2006 | Davie et al. | 235/440 |
| 7,076,453 B2 | 7/2006 | Jammes et al. | 705/26 |
| 7,077,512 B2 * | 7/2006 | Kobayashi et al. | 347/19 |
| 7,089,973 B2 * | 8/2006 | Nicodem et al. | 347/86 |
| 7,107,836 B2 * | 9/2006 | Brookner | 73/290 R |
| 7,124,097 B2 | 10/2006 | Claremont et al. | 705/26 |
| 7,128,408 B2 * | 10/2006 | Kosugi | 347/86 |
| 7,131,585 B2 | 11/2006 | Gyi et al. | 235/385 |
| 7,137,000 B2 * | 11/2006 | Hohberger et al. | 713/168 |
| 7,147,148 B2 | 12/2006 | Kreuter | 235/380 |
| 7,152,047 B1 | 12/2006 | Nagel | |
| 7,284,279 B2 | 10/2007 | Morrison et al. | |
| 7,296,873 B2 * | 11/2007 | Harada et al. | 347/23 |
| 7,342,597 B2 | 3/2008 | Squires et al. | |
| 7,395,246 B2 | 7/2008 | Brickell et al. | |
| 7,399,047 B2 * | 7/2008 | Ward et al. | 347/19 |
| 2001/0045455 A1 | 11/2001 | Kreuter et al. | |
| 2001/0053947 A1 | 12/2001 | Lenz et al. | 700/23 |
| 2002/0051167 A1 | 5/2002 | Francis et al. | |
| 2002/0072998 A1 | 6/2002 | Haines et al. | 709/200 |
| 2002/0116301 A1 | 8/2002 | Chapman et al. | 705/28 |
| 2002/0165961 A1 | 11/2002 | Everdell et al. | |
| 2002/0180993 A1 | 12/2002 | Klinefelter et al. | 358/1.15 |
| 2002/0194064 A1 * | 12/2002 | Parry et al. | 705/14 |
| 2003/0028766 A1 | 2/2003 | Gass et al. | 713/164 |
| 2003/0039799 A1 | 2/2003 | Luxem | |
| 2003/0046171 A1 | 3/2003 | Whale | 705/26 |
| 2003/0050868 A1 | 3/2003 | Hoffman et al. | |
| 2003/0050899 A1 | 3/2003 | Tushie et al. | |
| 2003/0058297 A1 * | 3/2003 | Saruta | 347/19 |
| 2003/0059050 A1 * | 3/2003 | Hohberger et al. | 380/270 |
| 2003/0182587 A1 | 9/2003 | Morrison et al. | |
| 2003/0216826 A1 | 11/2003 | Klinefelter | 705/65 |
| 2004/0046821 A1 * | 3/2004 | Kosugi | 347/19 |
| 2004/0059822 A1 | 3/2004 | Jiang et al. | |
| 2004/0093526 A1 | 5/2004 | Hirsch | |
| 2004/0099742 A1 | 5/2004 | Minami et al. | |
| 2004/0100363 A1 | 5/2004 | Lane et al. | |
| 2004/0109715 A1 | 6/2004 | Meier et al. | 400/208 |
| 2005/0060239 A1 | 3/2005 | Holland et al. | 705/26 |
| 2005/0129281 A1 | 6/2005 | Ashizaki et al. | |
| 2005/0150740 A1 | 7/2005 | Finkenzeller et al. | |
| 2005/0240498 A1 | 10/2005 | Thaler | |
| 2005/0257253 A1 | 11/2005 | Ekers | 713/201 |
| 2006/0037065 A1 | 2/2006 | Ekers et al. | |
| 2006/0123471 A1 | 6/2006 | Fontanella et al. | 726/5 |
| 2006/0146081 A1 * | 7/2006 | Vandermeulen et al. | 347/14 |
| 2006/0191022 A1 | 8/2006 | Hohberger et al. | |
| 2006/0279588 A1 * | 12/2006 | Yearworth et al. | 347/6 |
| 2007/0062402 A1 | 3/2007 | Ryan, Jr. et al. | |

FOREIGN PATENT DOCUMENTS

| | | |
|---|---|---|
| DE | 196 01 358 A1 | 1/1996 |
| DE | 196 44 306 A1 | 5/1998 |
| DE | 10 2006 004 091 B3 | 6/2007 |
| EP | 0 195 104 A1 | 9/1986 |
| EP | 0 278 517 A2 | 8/1988 |
| EP | 0 562 979 A2 | 9/1993 |
| EP | 0 562 979 A3 | 9/1993 |
| EP | 0 597 135 A1 | 5/1994 |
| EP | 0 659 588 A2 | 6/1995 |
| EP | 0 887 197 A2 | 12/1998 |
| EP | 0 924 597 A2 | 6/1999 |
| EP | 0 887 197 A3 | 5/2000 |
| EP | 1 488 303 | 3/2003 |
| FR | 2 667 416 | 4/1992 |
| GB | 2 120 821 A | 12/1983 |
| JP | 8-187921 A | 7/1996 |
| JP | 2001-24838 | 1/2001 |
| JP | 2001-215231 | 8/2001 |
| WO | WO 86/07480 | 12/1986 |
| WO | WO 95/09084 | 4/1995 |
| WO | WO 96/39656 | 12/1996 |
| WO | WO 98/51508 | 11/1998 |
| WO | WO 98/52762 | 11/1998 |
| WO | WO 99/21713 | 5/1999 |
| WO | WO 99/49379 | 9/1999 |
| WO | WO 00/43932 | 7/2000 |
| WO | WO 03/019459 A3 | 3/2003 |
| WO | WO 03/059632 A1 | 7/2003 |
| WO | WO 03/060811 A2 | 7/2003 |
| WO | WO 03/079168 A2 | 9/2003 |
| WO | WO 03/079168 A3 | 9/2003 |
| WO | WO 2004/011268 A1 | 2/2004 |
| WO | WO 2004/027715 A2 | 4/2004 |
| WO | 2006/069887 A1 | 7/2007 |

OTHER PUBLICATIONS

U.S. Appl. No. 60/623,622, filed Oct. 29, 2004 entitled "ribbon print security tracking".

U.S. Appl. No. 60/668,257, filed Apr. 5, 2005 entitled "print consumable security".

Office Action dated Apr. 26, 2005 for U.S. Appl. No. 10/937,739, filed Sep. 9, 2004.

Office Action dated Nov. 22, 2005 for U.S. Appl. No. 10/937,739, filed Sep. 9, 2004.

U.S. Appl. No. 60/611,614, filed Sep. 21, 2004 entitled "Challenge-Response Security Feature, Incomplete Print Job Processing Prevention and Print Job Encryption".

U.S. Appl. No. 11/232,427, filed Sep. 21, 2005 entitled "Prevention of Unauthorized Credential Production in a Credential Production System".

Office Action dated Sep. 15, 2004 for U.S. Appl. No. 10/647,666, filed Aug. 25, 2003.

Office Action dated Oct. 14, 2004 for U.S. Appl. No. 10/126,441, filed Apr. 19, 2002.

Office Action dated Feb. 15, 2005 for U.S. Appl. No. 10/372,071, filed Feb. 21, 2003.

Office Action dated Apr. 6, 2006 for U.S. Appl. No. 10/176,096, filed Jun. 20, 2002.

Office Action dated Jul. 27, 2006 for U.S. Appl. No. 10/126,428, filed Apr. 19, 2002.

International Search Report dated Jul. 18, 2003 for PCT Application No. PCT/US03/06187, filed Feb. 28, 2003. Search Report date of Jul. 18, 2003.

International Search Report and Written Opinion dated Nov. 30, 2006 for PCT Application No. PCT/US2005/15176, filed May 3, 2005.

Anon, "Instantly Re-Order Toner Cartridges Online Using HP's Smartchip," M2 Presswire, Oct. 19, 2001, 2 pages.

UbiQ Smart Card Software Makes New FARGO Printers Complete Card-Issuance Systems Issuers Can Print and Personalize Smart Cards Using Pro Series ID Card Printers Combined with Ubiq's Personalization Software, Apr. 1998.

Stone, H. S., Microcomputer Interfacing, Addison-Wesley, pp. 1-2, 1982.

DataCard Debuts Image and Data Retrieval Software for Enterprise Applications, Apr. 1998, Business Wire, Inc.

www.SmartIDCard.com, Jul. 2002, 4 pages, "Card Printing Service", 5 pages, Smart ID Card—Card Printing Services, ID Cards, Card Supplies, Smart Card Solutions.

OrdaCard announces new Internet based high volume secured photo ID card production services, Oct. 1998, Business Wire, Inc.

* cited by examiner

SECURELY PROCESSING AND TRACKING CONSUMABLE SUPPLIES AND CONSUMABLE MATERIAL

The present application claims the benefit of U.S. provisional patent application Ser. Nos. 60/709,401 filed Aug. 18, 2005 and 60/715,945, filed Sep. 9, 2005; and is a continuation-in-part of U.S. patent application entitled "CREDENTIAL PRODUCTION USING A SECURED CONSUMABLE SUPPLY", Ser. No. 11/261,450, filed Oct. 28, 2005, all of which are hereby incorporated by reference in their entirety.

FIELD OF THE INVENTION

The present invention is generally directed to a credential production system. More particularly, the present invention is directed to methods and components for processing a secure credential substrate using a credential production system.

BACKGROUND OF THE INVENTION

Credentials include identification cards, driver's licenses, passports, and other valuable documents. Such credentials are formed from credential substrates including paper substrates, plastic substrates, cards and other materials. Such credentials generally include printed information, such as a photo, account numbers, identification numbers, and other personal information that is printed on the credential substrates using a print consumable, such as ink and ribbon. A secure overlaminate or security label may also be laminated to the surfaces of the credential substrate to protect the printed surfaces from damage or provide a security feature (e.g., hologram). Additionally, credentials can include data that is encoded in a smart card chip, a magnetic stripe, or a barcode, for example.

Credential manufacturing systems or credential production systems generally include at least one credential processing device that processes a credential substrate to perform at least one step in forming the final credential product. Such credential processing devices include, for example, printing devices for printing images to the credential substrate, laminating devices for laminating an overlaminate to the credential substrate, devices for attaching labels, and encoding devices for encoding data to the substrate.

Credential production devices process a credential substrate in response to a credential processing job generated by a credential producing application. The credential processing job generally defines the printing, laminating, attaching and/or encoding processes that are to be performed by the credential manufacturing device on the credential substrate.

There is a great demand for generating credentials that include security features that are designed to prevent counterfeiting. In one example, printed credentials, such as identification cards, can be laminated with an overlaminate that includes custom security markings, such as holograms, which cannot be easily duplicated. Also, credentials can include special layers of materials that reveal attempts to tamper with the credential. Similar to lamination, security labels can be attached with or without heating There is also a great demand to prevent the unauthorized use of credential manufacturing systems to produce unauthorized credentials. In one example, the consumable supplies (e.g., print ribbon, overlaminate supply, label supply, substrate supply, etc.) that are required to produce the consumable are customized for limited use with only specifically authorized credential production devices, such as disclosed in U.S. Patent Publication No. 2003/0216826 assigned to Fargo Electronics, Inc. of Eden Prairie, Minn. Such a limitation on the use of the customized supplies can prevent a counterfeiter from seizing the supplies and using them with an unauthorized credential production device to produce counterfeit credentials.

While such customized supplies can provide a sound defense to counterfeiting by those who do not have access to the credential manufacturing system that is authorized for use with the stolen customized credentials, the customized supplies cannot prevent unauthorized credential production from those that have access to the authorized credential manufacturing system. Thus, for example, an employee of a company who has access to both the customized supplies and the corresponding authorized credential manufacturing system could potentially make an unauthorized credential.

Embodiments of the present invention provide solutions to these and other problems, and offer other advantages over the prior art.

SUMMARY OF THE INVENTION

The following disclosure is directed to a secured credential production system. The credential production system includes a consumable supply and a memory that contains a state identifier that defines a state of the supply. A supply manager is configured to access the memory and set the state identifier to one of a production disabled state and a production enabled state. The credential production system also includes a credential production device that is configured to receive the state of the supply. The credential production device is authorized to process a credential substrate using the consumable supply when the state identifier is set to the production enabled state, and the credential production device is prevented form processing the credential substrate using the supply when the state identifier is set to the production disabled state.

The disclosure also provides a method for securely processing a credential substrate using a consumable supply. A state identifier is provided that defines the state of a consumable supply. The state identifier is contained in memory. The state identifier is set to one of a production disabled state and a production enabled state. A credential substrate is processed with the state identifier and is set to the production enabled state.

The disclosure also provides a method of tracking quantities of consumable material in a plurality of consumable supplies. A plurality of consumable supplies are provided. Each consumable supply includes a memory indicating a fill amount of consumable material. At least a portion of the plurality of consumable supplies is used in at least one credential production device for processing credential substrates. The memories of each of at least the portion of consumable supplies are programmed that were used in the at least one credential production device. Each programmed memory indicates a partial amount of consumable material.

DETAILED DESCRIPTION OF THE PREFERRED EMBODIMENTS

Embodiments of the disclosure include the secure production, issuance and manufacture of valuable documents as well as the secure tracking of quantities of consumable material. Such valuable documents include, for example, credentials, such as identification badges, loyalty cards, financial bank cards, phone cards, healthcare cards, passports, birth certificates or other printed documents where secure issuance is desire. Embodiments of the disclosure specifically include the secure production, issuance and manufacture of a document as well as the secure tracking of consumable material through the control of a consumable supply and a supply manager.

Figure 1:
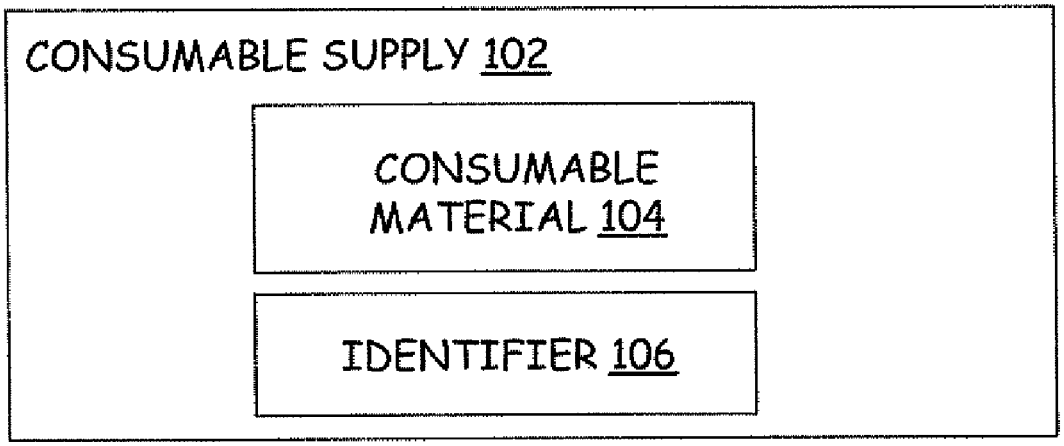
FIG. 1 is a simplified block diagram of one embodiment of a consumable supply.

FIG. 1 illustrates a schematic diagram of a consumable supply 102 in accordance with one embodiment. Exemplary consumable supplies include a supply of credential substrates (e.g., a cartridge or hopper containing the substrates), a print consumable (e.g. ink or dye contained in a ribbon or cartridge) for application to the substrate, an overlaminate supply, a security label, and other types of consumable supplies. Consumable supply 102 includes consumable material 104 and a supply identifier 106. Supply identifier 106 can be a radio frequency identification (RFID) tag or chip, a contact chip or other alternate technology that allows reading of supply identifier 106 located in the supply. Supply identifier 106 is a unique supply identifier that corresponds with consumable supply 102. The supply identifier 106, for example, can include a product supply identifier such as a serial number.

Figure 2:
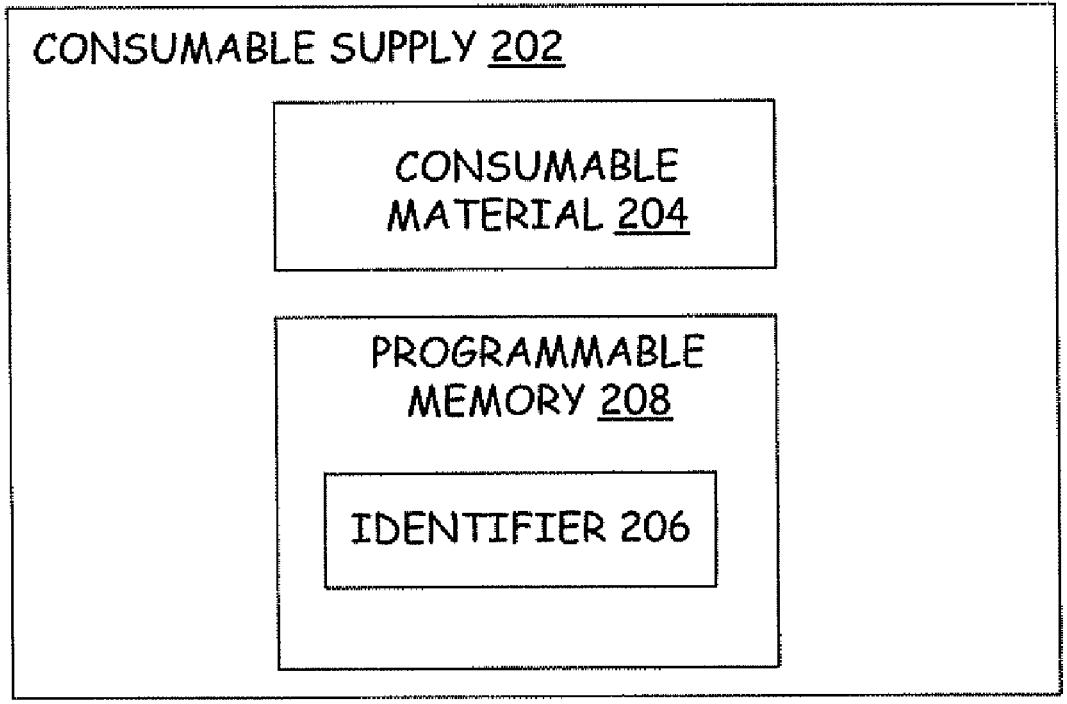
FIG. 2 is a simplified block diagram of another embodiment of a consumable supply.

FIG. 2 illustrates a schematic diagram of a consumable supply 202 in accordance with another embodiment. Consumable supply 202 includes consumable material 204 and a programmable memory 208. Programmable memory 208 can be a radio frequency identification (RFID) tag or chip, a contact memory chip or other alternate technology that allows reading and writing to a memory located in the supply. Programmable memory 208 is configured to store supply information. For example, supply information can include a product supply identifier such as a serial number, a security code or other related security information such as a security key or encryption key, the current process state of the secure consumable material, the consumed or remaining count of the consumable which is contained in the consumable material, an identification of the dealer of the consumable material and other related inventory information.

The consumable material 104, 204 in each consumable supply 102, 202 illustrated in both FIGS. 1 and 2 are used to produce, issue or manufacture valuable documents includes, for example, substrates, print consumables, overlaminate materials, security labels, and other types consumable materials. Substrates form the core of the document. Example substrates include cards, paper, plastic and etc. Print consumables include print material that is applied to substrates. Example print consumables include ribbon, ribbon cartridges, ink cartridges and etc. Overlaminate materials include materials that are applied to surfaces of the substrates. Example overlaminate materials include holograms, optically variable device (OVD) printed images and etc. Security Labels include adhesive labels and labels that are applied by a hot stamp. Similar to overlaminate materials these labels include holograms and OVD devices for security.

Figure 3:
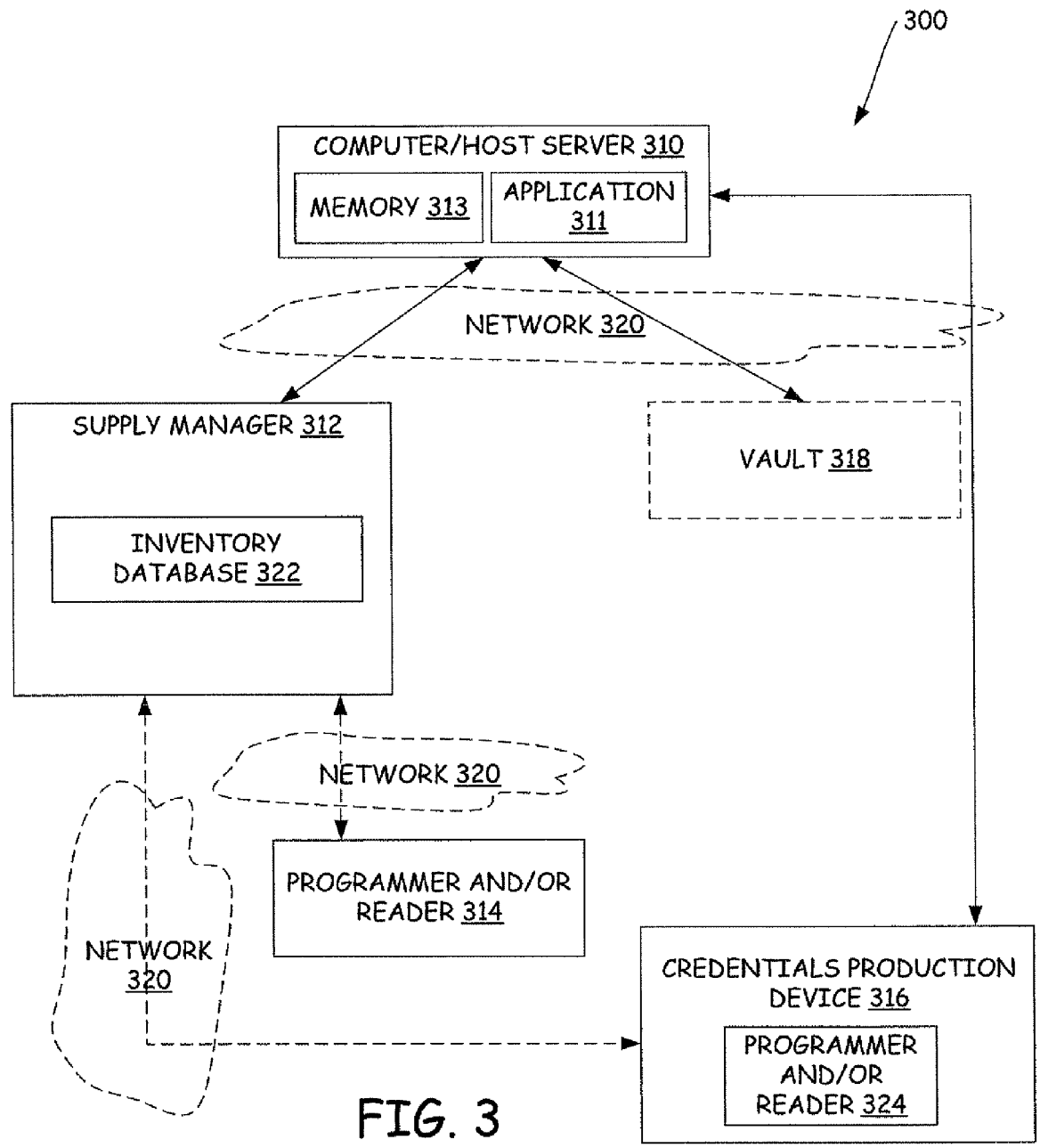
FIG. 3 is a schematic diagram of an exemplary credential production system.

FIG. 3 is a schematic diagram of an exemplary credential production system 300 in accordance with an embodiment. System 300 includes a computing device or host server 310, an inventory management system or supply manager 312, a programmer and/or reader 314 and a credentials production device 316. Computing device/host server 310 includes a credential processing application 311 that generates and stores credential processing jobs in a memory 313. The credential processing jobs include processing instructions for processing a credential substrate and are communicated to credential production device 316.

Supply manager 312 is coupleable to computing device/host server 310 and is configured to track consumable supplies based on inventory location and process states. In one embodiment, supply manager 312 can be stored in a computer-readable medium that is located remotely from, but accessible by computing device/host server 310. In another embodiment, although not illustrated in FIG. 3, computing device/host server 310 includes supply manager 312. Credentials production device 316 is coupleable to computing device/host server 310 and supply manager 312. Credential production device 316 is configured to process a credential substrate (e.g. card substrates, paper substrates, plastic substrates, substrates used to form passports and other valuable substrate documents) by using at least one consumable supply to perform at least one step in forming a credential (e.g. identification card, passport, employee badge and etc.). Exemplary credential production devices include printing devices (e.g. printers and etc.) for printing images to the credential substrate, laminating devices for laminating an overlaminate to the credential substrate and encoding devices for encoding data (e.g. writing a barcode, recording data to a magnetic stripe, writing data in a memory chip and etc.) to the credential substrate. Programmer and/or reader 314 is coupleable to supply manager 312. If the component 314 is just a reader, it is configured to read a supply identifier from the consumable supply, such as supply identifier 106 of consumable supply 102. However, the programmable memory 208 having supply identifier 206 of consumable supply 202 can also be read. If component is programmer and is reader, it is configured to encode data to a programmable memory in the consumable supply, such as programmable memory 208 of consumable supply 202, and also read programmable memory 208. It should be noted that consumable supply 102 illustrated in FIG. 1 does not have a programmable memory and therefore can not be programmed with encoded data. Credential production system 300 can also optionally include a secured storage or vault 318. Secured storage 318 is coupleable to computing device/host server 310 and is configured to receive and store consumable supplies for use in processing credential substrates.

In one embodiment and as illustrated in dashed lines in FIG. 3, computing device/host server 310 can communicate with supply manager 312, credential production device 316 and vault 318 over a network 320, such as an internet or intranet. In such an embodiment, computing device/host server 310 can be remotely located from supply manager 312, programmer and/or reader 314, credential production device 316 and secured storage 318. In another embodiment, computing device/host server 310 can communicate with supply manager 312, credential production device 316 and secured storage 318 directly using conventional methods such as including a physical communication link (i.e. cable connection such as, for example, a Universal Serial Bus) or a wireless communication link (such as, for example infrared or radio frequency). In such an embodiment, computing device/host server 310 is located in proximity to supply manager 312, programmer and/or reader 314, credentials production device 316 and secured storage 318. In other embodiments, programmer and/or reader 314, credentials production device 316 and secured storage 318 can be located remotely from supply manager 312 and computing device/host server 310 via network 320. In still other embodiments, supply manager 312 can be located remotely from computing device/host server 310 and remotely located from programmer and/or reader 314, credentials production device 316 and secured storage 318 via network 320. It should be noted that although FIG. 3 illustrates a single computing device/host server 310, it should be understood that the present invention can include more than one computing device/host server to be used to control and run different components of credential production system 300.

To securely processing a credential substrate using a consumable supply, a consumable supply, such as consumable supply 102 or 202 (FIGS. 1 and 2), is provided that is selectively in one of a plurality of states. The consumable supply is provided along with other consumable supplies at an issuance location. The issuance location can be a dealer of secure consumable supplies or local to the customer. Each provided secure consumable supply includes either a supply identifier 106, as illustrated in FIG. 1, or a programmable memory 208 having a supply identifier 206, as illustrated in FIG. 2. Consumable supply 102 or 202 can be selectively in an unauthorized state, a production disabled state and a production enabled state. An unauthorized state is a state at which consumable supply 102 or 202 has not yet been authorized for use in production of a credential substrate. Both production disabled state and production enabled state are states which the consumable supply has been authorized to be used in production of a credential substrate. When the consumable supply is initially provided to credential production system 300, it is in an unauthorized state.

Figure 4:
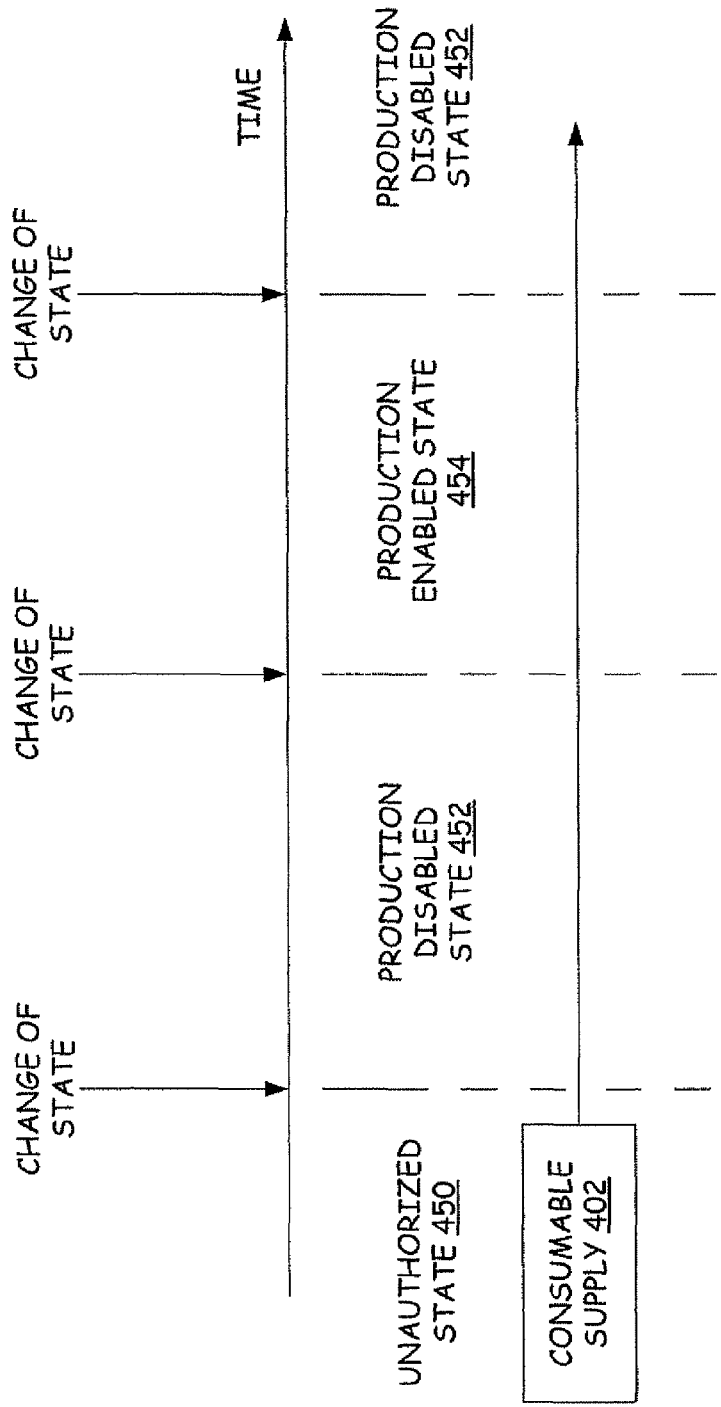
FIGS. 4 and 5 are simplified diagrams of various process states of a consumable supply over time.
Figure 5:
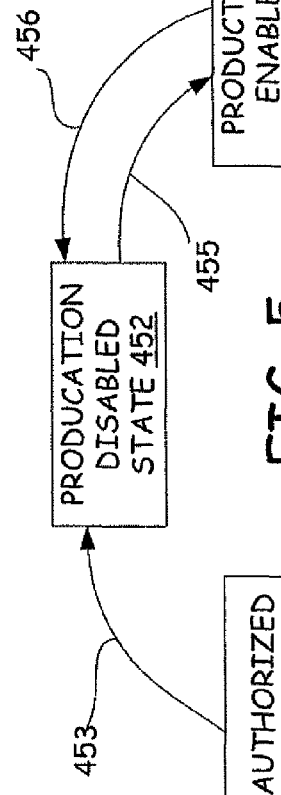

FIGS. 4 and 5 show detailed diagrams of the plurality of process states of which the embodiments of the consumable supply can be in throughout the process of being used to form a credential. In FIGS. 4 and 5, consumable supply 402 begins in an unauthorized state 450. Unauthorized state 450 is the state at which consumable supply 402 enters the issuance location to be enrolled in an inventory database, such inventory database 322 in supply manager 212. At the first dashed line in FIG. 4, the process state of consumable supply 402 changes from unauthorized state 450 to a production disabled state 452. After consumable supply 402 changes to a production disabled state, the consumable supply will never return to the unauthorized state as illustrated by arrow 453 in the diagram of FIG. 6.

To change the state of consumable supply 402 from an unauthorized state to a production disabled state, supply manager 312 first performs a security check on an operator to validate the identity of an operator. After attaining access, in one embodiment, the operator can locally change a state identifier in a state supply identifier record in inventory database 322 from an unauthorized state to a production disabled state. In another embodiment, the process state of consumable supply 402 can be remotely changed in inventory database 322 or by computing device/host server 310. For example, if an issuance location has a quantity of 100 consumable supplies that are enrolled in supply manager 312, a registered operator with privileges to change the process state of consumable supplies can remotely advance or locally advance (via computing device/host server 202) any or all of the 100 secure cartridges from an unauthorized state to a production disabled state. Advancing a limited amount of consumable supplies to a production disabled state controls production without putting significant quantities of consumable supplies at risk of a security breach.

Changing the state of consumable supply 402 from a production disabled state to a production enabled state is necessary to use the consumable supply with a credential production device, such as credential production device 316. At the second dashed line in FIG. 4 and also illustrated by arrow 455 in FIG. 5, the process state of consumable supply 402 changes from the production disabled state 452 to a production enabled state 454. After consumable supply 402 changes to the production enabled state 454, the consumable supply can return to a production disabled state as denoted by the third dashed line in FIG. 4 and also illustrated by arrow 456 in FIG. 5.

To change the state of consumable supply 402 from a production disabled state to a production enabled state, the operator removes the consumable supply 402 from a secured storage or vault, such as vault 318. An operator can unlock vault 318 through a security check. In one embodiment, after the operator has taken a consumable supply out of vault 318, programmer and/or reader 314 reads a supply identifier on the consumable supply, such as supply identifier 106 in consumable supply 102 or supply identifier 206 in consumable supply 202. By reading the supply identifier, the state identifier in the state identifier record in the inventory database 322 or 422 of supply manager 312 or 412 is changed from a production disabled state to a production enabled state. In another embodiment, the operator removes a consumable supply from vault 318 and uses programmer and/or reader 414 to encode a production enabled state on programmable memory 208. In this embodiment, the state identifier of the consumable supply is stored in the programmable memory of the consumable supply Referring back to FIG. 3, credential production system 300 has a credential production device 316 that includes a programmer and/or reader 324. Programmer and/or reader 324 is configured to read a supply identifier of a consumable supply when the consumable supply is inserted into the credential production device. For example, programmer and/or reader 324 is configured to read supply identifier 106 of consumable supply 102 when it is inserted into credential production device 318. In another example, programmer and/or reader 324 is configured to read programmable memory 208 which includes supply identifier 206 when it is inserted into credential production device 418.

When an operator removes a consumable supply, such as either consumable supply 102 or 202, from vault 318 to change the state of the consumable supply to a production enabled state, supply manager 312 also notes the time and date of removal of the consumable supply from the vault to change the state of the consumable to an production enabled state. In one embodiment, supply manager 312 expects that the consumable supply will be inserted into credential production device 318 within a predetermined period of time. Therefore, when the state of the consumable supply is changed to a production enabled state, either as written in inventory database 322 or as written to a programmable memory, such as programmable memory 208 of consumable supply 202, programmer and/or reader 324 of credential production device 316 is given a predetermined amount of time to read the consumable supply. In other words, the consumable supply needs to be inserted in credential production device 316 within the predetermined period of time. By reading the consumable supply, programmer and/or reader 324 indicates that the consumable supply is present within credential production device 316.

In one embodiment, after the predetermined period of time elapses, supply manager 312, if the state identifier is stored in the state identifier record in supply manager 312, automatically changes the state of the consumable supply to a production disabled state. If the consumable supply is read by programmer and/or reader 324 before the elapse of the predetermined period of time, then the supply manager maintains the consumable supply in a production enabled state. Such an action will prevent the consumable supply from working with credential production device 316 even if the consumable supply ends up in the credential production device 316 at a time later than the predetermined time. In another embodiment, if the predetermined period of time elapses before programmer and/or reader 324 of credential production device 316 is able to read the consumable supply, then supply manager 312 is configured to produce a warning. This warning can be issued administrators of the credential production system 300. The warning indicates that either the consumable supply that was changed to a production enabled state is stolen or that there is a security breach regarding that consumable supply before it is installed in credential production system 300. In either embodiment, failures by programmer and/or reader 324 to read a consumable supply after an elapse of the predetermined time can be logged into a log or audit trail in supply manager 312.

Figure 6:
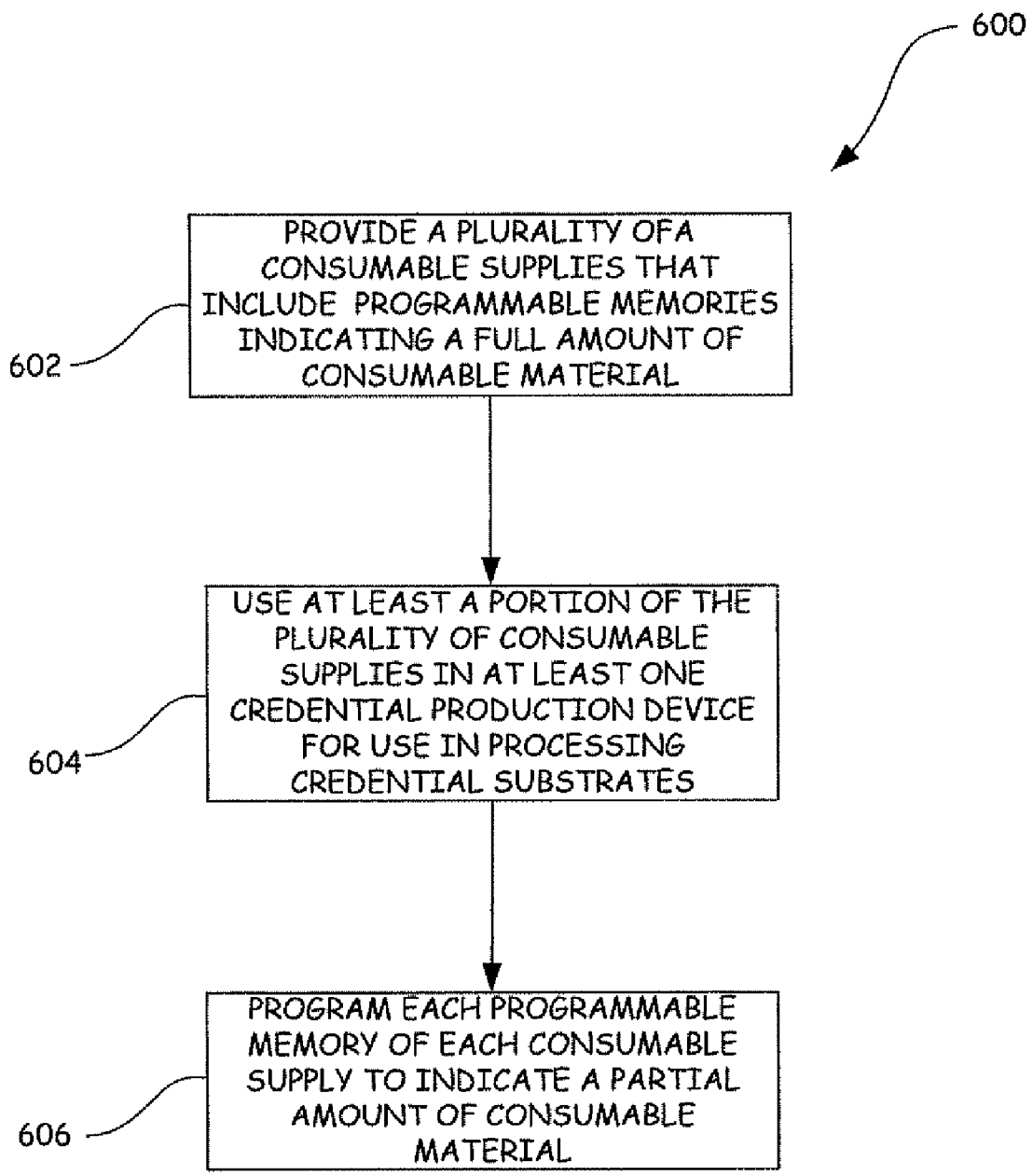
FIG. 6 is a flowchart illustrating a method of tracking quantities of consumable material in a plurality of consumable supplies using a credential production system.

FIG. 6 illustrates a method 600 of tracking quantities of consumable material in a plurality of consumable supplies. A consumable supply, such as consumable supply 202 illustrated in FIG. 2, includes a programmable memory, such as programmable memory 208, which is readable or writable by a programmer and/or reader, such as programmer and/or reader 314 located remotely from a credential production device, such as credential production device 316, or programmer and/or programmer and/or reader 324 positioned in credential production device 316. Data included in the programmable memory of the consumable supply is encrypted using the memory's unique identifier, such as identifier 206.

When consumable supply 202 is manufactured, a digital value representing that the consumable supply 202 is in a "new" state is programmed into programmable memory 208. Writing such a digital value represents that consumable supply 202 has a fill amount of consumable material 204 (i.e., none of consumable material 204 has been used). For example, if the consumable supply is a print ribbon, a "new" digital value represents that print ribbon on the roll is all and has not yet been used. At block 602, a plurality of consumable supplies, such as consumable supplies like consumable supply 202 having programmable memory 208, are provided that indicate full amount of consumable material, such as consumable material 204. These plurality of consumable supplies are provided to an issuance location. The issuance location can be a dealer of secure consumable supplies or local to the customer. At the issuance location the consumable supply along with other consumable supplies having programmable memories represented as "new" are enrolled in an inventory database, such as inventory database 322. As previously discussed, after enrollment, the process state of each consumable supply 202 can change from an unauthorized state to a production disabled state. While in a production disabled state, each consumable supply 202 can be stored in vault 318. Changing the state of each consumable supply 202 from a production disabled state to a production enabled state is necessary to use each of the consumable supplies with a credential production device 316. After changing each consumable supply 202 to a production enabled state as outlined above, at block 604, at least a portion of the plurality of consumable supplies are used in at least one credential production device, such as credential production device 316, for processing credential substrates.

After being used in a credential production device, at block 606, each programmable memory 208 of each consumable supply 202 is programmed by programmer and/or reader 324 with a new digital value stored in the programmable memory that represents a "partial" state. Writing such a digital value represents that consumable supply 202 has a partial amount of consumable material 204 that has been used. For example, if the consumable supply is a print ribbon, a "partial" digital value represents that there is at least a portion of print ribbon on the roll. After each consumable supply 202 that was used in a credential production device is programmed to indicate a partial amount of consumable material 204, each consumable supply can be returned to vault 318 for later use. To be put back into vault 318, each consumable supply can be changed from a production enabled state to a production disabled state for later return to a production enabled state. However, each consumable supply put back into vault 318 after being used in credential production device 316 will continue to have a programmable memory 208 that indicates a partial amount of consumable material 204.

When one of the plurality of consumable supplies 202 is expended in credential production device 316, programmable memory 208 is reprogrammed with a new value that represents an "empty" state. Writing such a digital value represents that consumable supply 202 has an empty amount of consumable material 204. For example, if the consumable supply is a print ribbon, an "empty" digital value represents that print ribbon on the roll has been totally consumed. After each consumable supply 202 that was used in a credential production device is programmed to indicate an empty amount of consumable material 204, each consumable supply can be returned to vault 318 for later secure destruction. To be put back into vault 318, each consumable supply can be changed from a production enabled state to a production disabled state.

At any given moment there will be a total quantity of consumable material that is available for use in credential production devices. For example, the total quantity of available consumable material includes a total of a first quantity of consumable supplies that have fill amounts of consumable material and a second quantity of consumable supplies that have partial amounts of consumable material. Consumable supplies that are empty are not part of the total quantity of available consumable supplies. Supply manager 312 can log both the first quantity of consumable supplies having full amounts of consumable material and the second quantity of consumable supplies that partial amounts of consumable material. This log keeps a running total of the first quantity and the second quantity. Supply manager 312 can also store a threshold quantity of available consumable material. If the total quantity of consumable material is less than the threshold quantity, then credential production system automatically reorders the proper amount of consumable material to reach a quantity that is above the threshold quantity of consumable material.

Although the present invention has been described with reference to preferred embodiments, workers skilled in the art will recognize that changes may be made in form and detail without departing from the spirit and scope of the invention.

What is claimed is:

1. A credential production system comprising:
a consumable supply including an amount of print consumable;
a memory containing a state identifier that defines a production state of the consumable supply;
a supply manager configured to access the memory and selectively set the state identifier to one of a production disabled state and a production enabled state independent of the amount of print consumable; and
a credential production device configured to receive the state identifier of the consumable supply from the memory when the consumable supply is inserted into the credential production device, wherein the credential production device is authorized to process a credential substrate using the consumable supply if the state identifier is set to the production enabled state, and the credential production device is prevented from processing the credential substrate using the consumable supply if the state identifier is set to the production disabled state.

2. The system of claim 1, wherein the memory is attached to the consumable supply.

3. The system of claim 1, wherein the memory is remotely located from the consumable supply.

4. The system of claim 1, wherein the supply manager is configured to set the state identifier to the production enabled state for a predetermined period of time, after which the state identifier automatically reverts to the production disabled state if the credential production device is unable to detect the consumable supply.

5. The system of claim 4, wherein the supply manager is configured to maintain the state identifier in the production enabled state if the consumable supply is used by the credential production device before the expiration of the predetermined period of time.

6. The system of claim 4, wherein the supply manager is configured to produce a warning at the expiration of the predetermined period of time.

7. The system of claim 1, wherein the credential production device includes a reader configured to recognize a presence of the consumable supply in the credential production device.

8. The system of claim 7, wherein the supply manager is configured to produce a warning if the reader in the credential production device fails to recognize the presence of the consumable supply in the credential production device after the elapse of a predetermined period of time from when the state identifier was set to the production enabled state.

9. The system of claim 7, wherein the supply manager is configured to log the failure of the reader in the credential production device to recognize the presence of the consumable supply in the credential production device after the elapse of a predetermined period of time from when the state identifier is set to the production enabled state.

10. The system of claim 1, wherein the state identifier is configured to be set to a production enabled state from a production disabled state and the state identifier is configured to be set to a production disabled state from a production enabled state.

11. A method of securely processing a credential substrate using a consumable supply, the method comprising:
providing a state identifier that defines a production state of a consumable supply having an amount of print consumable, the state identifier contained in a memory;
authorizing the consumable supply for use in processing the credential substrate by accessing the memory and setting the state identifier to one of a production disabled state and a production enabled state, wherein the state identifier is set to a production enabled state from a production disabled state and the state identifier is set to a production disabled state from a production enabled state independent of the amount of print consumable in the consumable supply; and
processing the credential substrate using a credential production device when the state identifier is set to the production enabled state.

12. The method of claim 11, further comprising preventing the credential substrate from being processed when the state identifier is set to the production disabled state.

13. The method of claim 11, further comprising:
attempting to recognize a presence of the consumable supply in the credential production device; and
producing a warning if the presence of the consumable supply is not recognized after an elapse of a predetermined period of time from when the state identifier is set to the production enabled state.

14. The method of claim 11, further comprising:
attempting to recognize a presence of the consumable supply in the credential production device; and
logging a failure to recognize the presence of the consumable supply after an elapse of a predetermined period of time from when the state identifier is set to the production enabled state.

15. A method of tracking quantities of consumable material in a plurality of consumable supplies, the method comprising:
providing a plurality of consumable supplies, each consumable supply including a memory indicating a full amount of consumable material;
using at least a portion of the plurality of consumable supplies in at least one credential production device for use in processing credential substrates;
programming the memories of each of at least the portion of consumable supplies used in the at least one credential production device, each programmed memory indicating a partial amount of consumable material;
logging in a supply manager a first numerical quantity of the plurality of consumable supplies that have the full amount of consumable material; and
logging in the supply manager a second numerical quantity of the plurality of consumable supplies that have the partial amount of consumable material.

16. The method of claim 15, further comprising storing the consumable supplies that include memories that are indicated as having the partial amount of consumable material in a secured storage.

17. The method of claim 15, further comprising reprogramming the memories of each consumable supply used in the at least one credential production device after the consumable material in each consumable supply used in the at least one credential production device is completely expended, each reprogrammed memory indicating an empty amount of consumable material.

18. The method of claim 17, further comprising storing the consumable supplies that include memories indicated as having the empty amount of consumable material in a secured storage in preparation for secure destruction.

19. The method of claim 15, further comprising determining whether a total quantity of available consumable material is less than a threshold quantity of consumable material, the total quantity of consumable material includes the first quantity of consumable supplies and the second quantity of consumable supplies.

20. The method of claim 19, further comprising reordering consumable supplies if the total quantity of consumable material is less than the threshold quantity.

* * * * *